United States Patent
Kobayashi et al.

(10) Patent No.: US 9,881,238 B2
(45) Date of Patent: Jan. 30, 2018

(54) IMAGE PROCESSING APPARATUS, IMAGE PROCESSING SYSTEM, AND NON-TRANSITORY COMPUTER READABLE MEDIUM CONFIGURED TO EXECUTE DIVISION OF PAGES BASED ON DETECTED IDENTIFICATION INFORMATION

(71) Applicant: FUJI XEROX CO., LTD., Tokyo (JP)

(72) Inventors: Kunihiko Kobayashi, Kanagawa (JP); Kazuhiro Oya, Kanagawa (JP); Katsuya Koyanagi, Kanagawa (JP); Shigeru Okada, Kanagawa (JP); Shintaro Adachi, Kanagawa (JP); Akane Yoshizaki, Kanagawa (JP); Hiroyuki Kishimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/142,799

(22) Filed: Apr. 29, 2016

(65) Prior Publication Data

US 2017/0161596 A1    Jun. 8, 2017

(30) Foreign Application Priority Data

Dec. 7, 2015    (JP) .................................. 2015-238775

(51) Int. Cl.
G06K 15/02    (2006.01)
H04N 1/00    (2006.01)
H04N 1/32    (2006.01)

(52) U.S. Cl.
CPC ..... *G06K 15/1802* (2013.01); *H04N 1/00795* (2013.01); *H04N 1/00801* (2013.01); *H04N 1/32133* (2013.01); *H04N 2201/3216* (2013.01); *H04N 2201/3269* (2013.01)

(58) Field of Classification Search
USPC ................................ 358/1.1–3.29, 1.11–1.18
See application file for complete search history.

(56) References Cited

U.S. PATENT DOCUMENTS

| | | | |
|---|---|---|---|
| 2007/0171473 A1* | 7/2007 | Iwasaki | G06F 17/30011 358/1.18 |
| 2012/0154853 A1* | 6/2012 | Otake | H04N 1/41 358/1.15 |

FOREIGN PATENT DOCUMENTS

| | | | | |
|---|---|---|---|---|
| JP | 2002-044318 A | | 2/2002 | |
| JP | 2013131044 | * | 7/2013 | ............. G06Q 50/22 |

* cited by examiner

*Primary Examiner* — Marcellus Augustin
(74) *Attorney, Agent, or Firm* — Oliff PLC

(57) ABSTRACT

Provided is an image processing apparatus including an image data obtaining unit that obtains image data of an original document including plural pages, a feature amount obtaining unit that obtains a predetermined feature amount for each of the pages based on the obtained image data, a detection unit that compares a feature amount of one page on which identification information for dividing the plural pages in units of pages is formed with a feature amount of the other pages and detects the identification information on a page having a feature amount similar to a feature amount of the one page from among the other pages, and a division unit that divides the plural pages in units of pages based on the detected identification information.

8 Claims, 7 Drawing Sheets

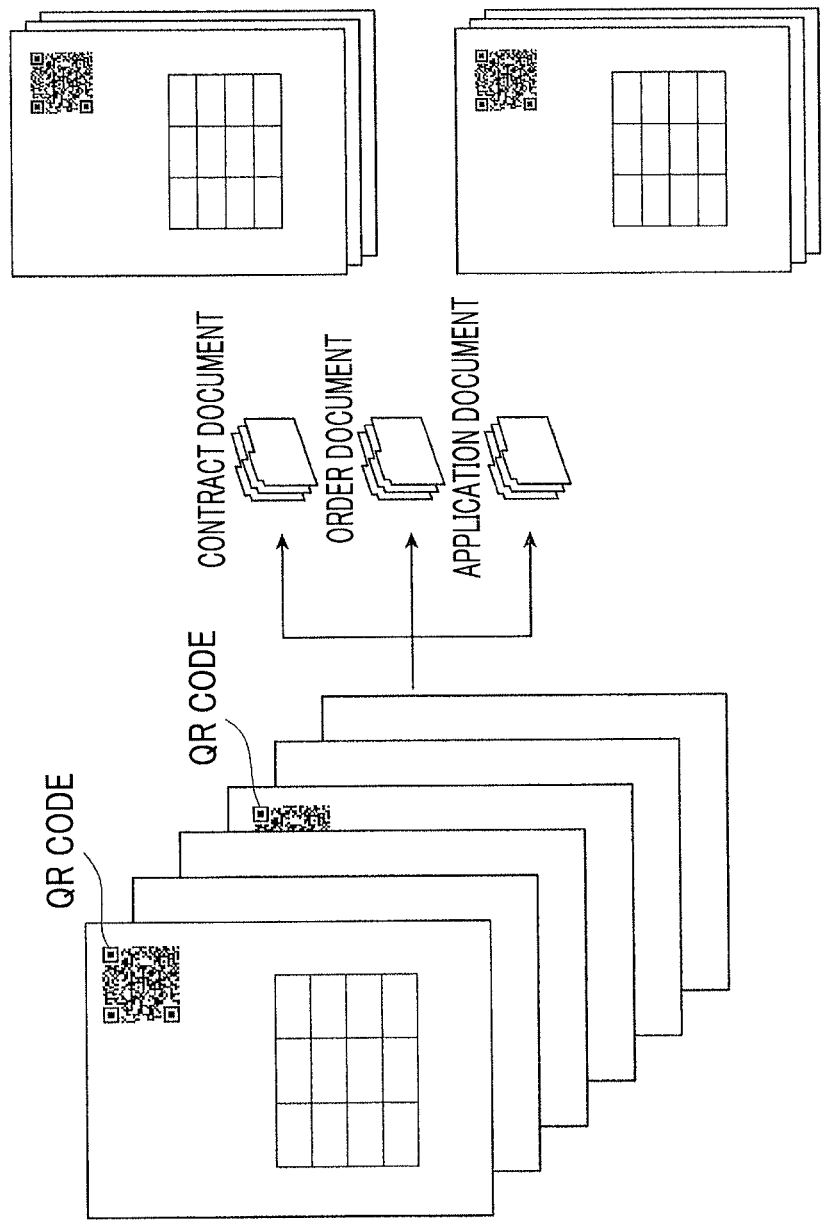

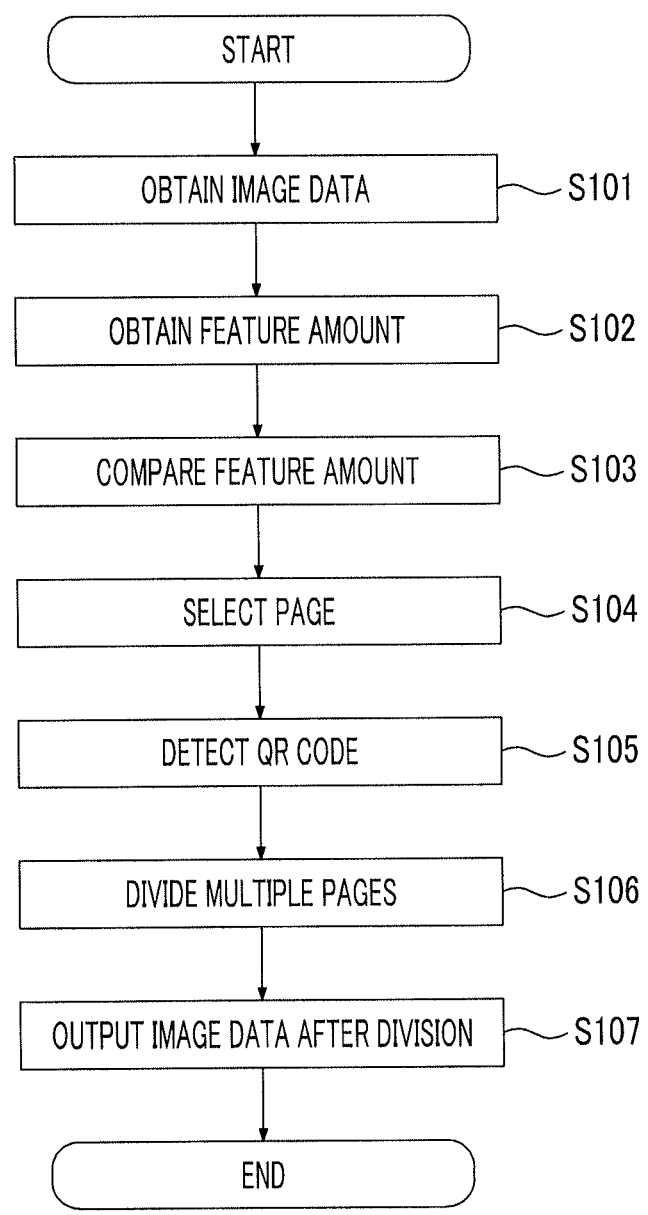

IMAGE PROCESSING APPARATUS, IMAGE PROCESSING SYSTEM, AND NON-TRANSITORY COMPUTER READABLE MEDIUM CONFIGURED TO EXECUTE DIVISION OF PAGES BASED ON DETECTED IDENTIFICATION INFORMATION

CROSS-REFERENCE TO RELATED APPLICATIONS

This application is based on and claims priority under 35 USC 119 from Japanese Patent Application No. 2015-238775 filed Dec. 7, 2015.

BACKGROUND (i) Technical Field

The present invention relates to an image processing apparatus, an image processing system, and a non-transitory computer readable medium.

(ii) Related Art

In the related art, an image reading device reads an image of an original document that is configured of multiple pages, and there is an image processing apparatus that performs processing such as retaining the read image data by dividing the image data in units of pages. At this point, identification information that is printed on the pages is used as information for the division of the read image data in units of pages.

SUMMARY

According to an aspect of the invention, there is provided an image processing apparatus including:

an image data obtaining unit that obtains image data of an original document including plural pages;

a feature amount obtaining unit that obtains a predetermined feature amount for each of the pages based on the obtained image data;

a detection unit that compares a feature amount of one page on which identification information for dividing the plural pages in units of pages is formed with a feature amount of the other pages and detects the identification information on a page having a feature amount similar to a feature amount of the one page from among the other pages; and a division unit that divides the plural pages in units of pages based on the detected identification information.

BRIEF DESCRIPTION OF THE DRAWINGS

Exemplary embodiments of the present invention will be described in detail based on the following figures, wherein:

FIGS. 3A and 3B are diagrams illustrating division of image data in units of pages;

FIG. 7 is a flowchart illustrating operation of the control device.

DETAILED DESCRIPTION

Overall Description of Image Forming Apparatus

Figure 1:
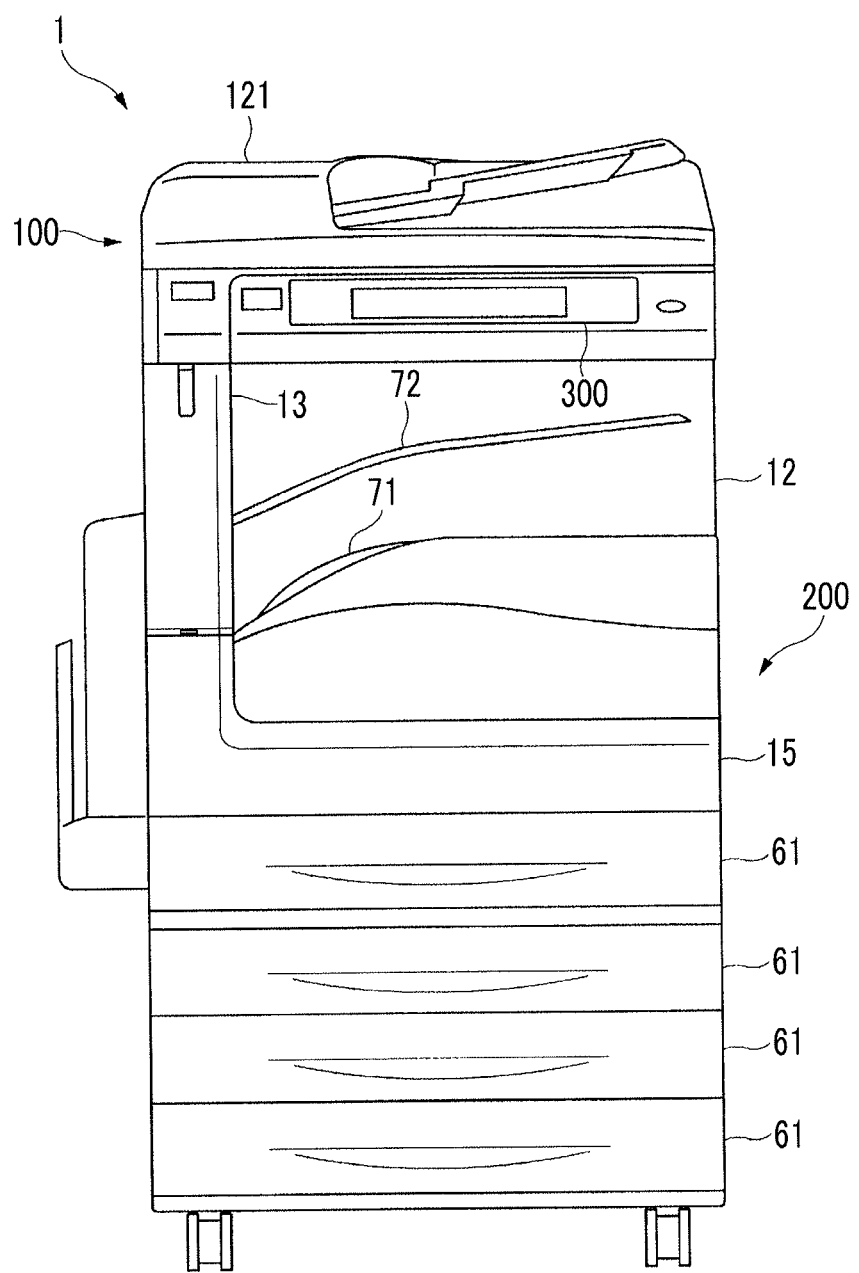
FIG. 1 is an exterior view of an image forming apparatus according to an exemplary embodiment.
Figure 2:
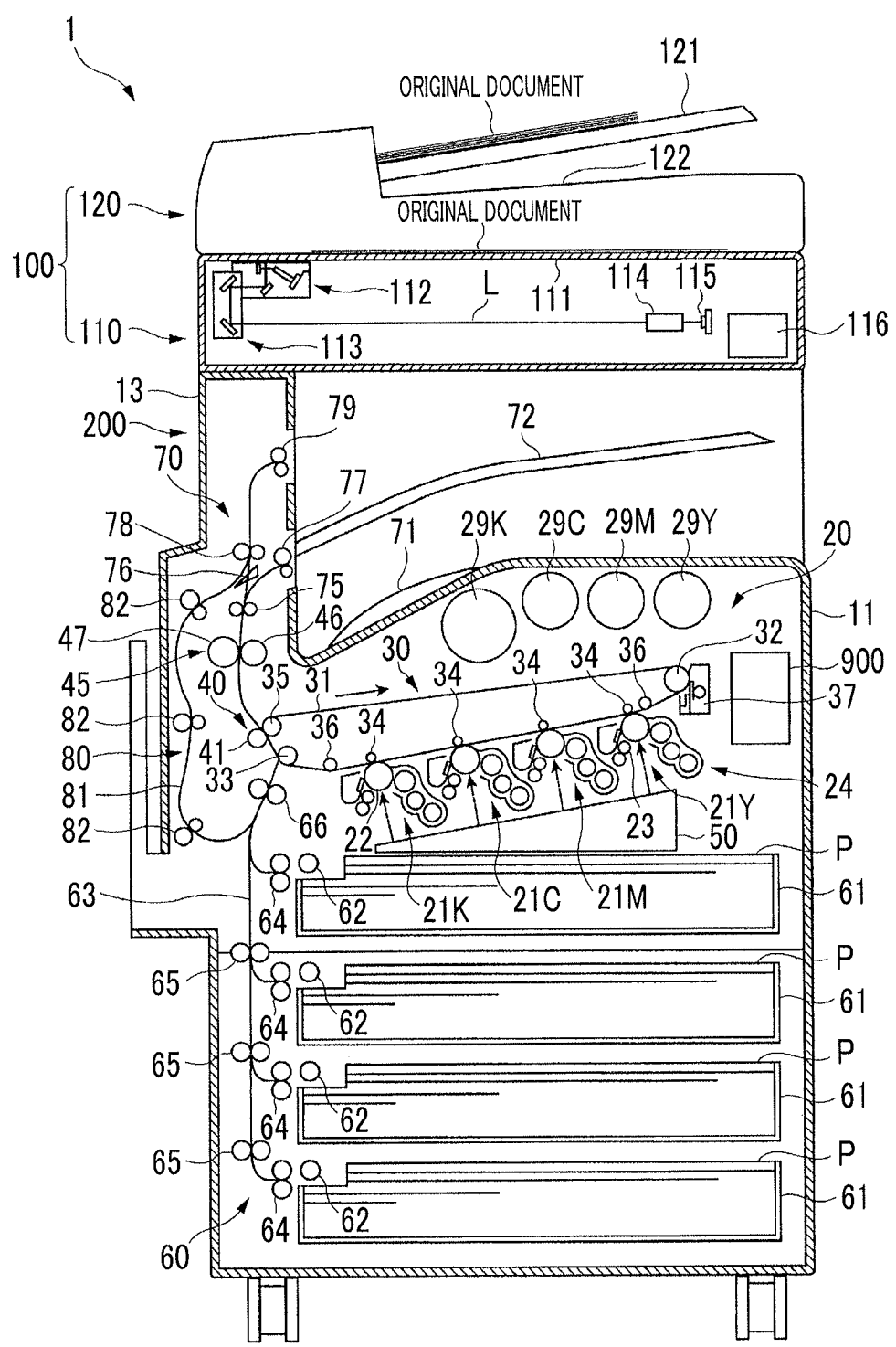
FIG. 2 is a diagram illustrating an internal structure of the image forming apparatus according to the exemplary embodiment.

FIG. 1 is an exterior view of an image forming apparatus 1 according to an exemplary embodiment. FIG. 2 is a diagram illustrating an internal structure of the image forming apparatus 1 according to the present exemplary embodiment.

The image forming apparatus 1 is an example of an image processing system and includes an image reading device 100 that reads an image of an original document and an image recording device 200 that forms an image on a recording material (which hereinafter may be referred to as "paper"). In addition, the image forming apparatus 1 includes a user interface (UI) 300 that receives an operational input from a user or displays various information to the user and a control device 900 that controls operation of the entirety of the image forming apparatus 1.

The image reading device 100 is an example of an image reader and is arranged in an upper portion of the image forming apparatus 1. The image recording device 200 is arranged on the lower side of the image reading device 100 and incorporates the control device 900. The user interface 300 is arranged on the front side of the upper portion of the image forming apparatus 1, that is, on the front side of an image reading unit 110, later described, of the image reading device 100.

First, the image reading device 100 will be described.

The image reading device 100 includes the image reading unit 110 that reads an image of an original document and an original document transport unit 120 that transports the original document to the image reading unit 110. The original document transport unit 120 is arranged in an upper portion of the image reading device 100, and the image reading unit 110 is arranged in a lower portion of the image reading device 100.

The original document transport unit 120 includes an original document accommodation unit 121 that accommodates the original document and an original document output unit 122 to which the original document transported from the original document accommodation unit 121 is output. The original document transport unit 120 transports the original document from the original document accommodation unit 121 to the original document output unit 122. The original document transport unit 120 is called an automatic original document feeding device (auto document feeder; ADF) as well.

The image reading unit 110 includes a platen glass 111, a light irradiation unit 112 that irradiates a read side (image side) of the original document with light, a light guide unit 113 that guides light L which is reflected by the read side of the original document after the read side of the original document is irradiated with the light L from the light irradiation unit 112, and an imaging lens 114 that images an optical image of the light L guided by the light guide unit 113. In addition, the image reading unit 110 includes a detection unit 115 that is configured of a photoelectric conversion element, such as a charge-coupled device (CCD) image sensor, performing photoelectric conversion of the light L imaged by the imaging lens 114 and detects the imaged optical image and includes an image processing unit 116 that is electrically connected to the detection unit 115 and to which an electrical signal obtained by the detection unit 115 is transmitted.

The image reading unit 110 reads an image of the original document transported by the original document transport unit 120 and an image of an original document placed on the platen glass 111.

Next, the image recording device 200 will be described.

The image recording device 200 includes an image forming section 20 that forms an image on a paper P, a paper supply unit 60 that supplies the paper P to the image forming section 20, a paper output unit 70 that outputs the paper P on which an image is formed by the image forming section 20, and a reversal transporting unit 80 that reverses the paper P on which an image is formed by the image forming section 20 on one side thereof to bring the inner side thereof outward and transports the reversed paper P again toward the image forming section 20.

The image forming section 20 includes four image forming units 21 (21Y, 21M, 21C, and 21K) of yellow (Y), magenta (M), cyan (C), and black (K) that are parallelly arranged at constant intervals. Each image forming unit 21 includes a photosensitive drum 22, a charger 23 that uniformly charges the surface of the photosensitive drum 22, and a developer 24 that develops and visualizes with predetermined color component toners an electrostatic latent image which is formed by laser irradiation performed by an optical system unit 50 later described. Toner cartridges 29Y, 29M, 29C, and 29K are disposed in the image forming section 20 in order to supply toners of each color to the developer 24 of each of the image forming units 21Y, 21M, 21C, and 21K.

The image forming section 20 includes, below the image forming units 21Y, 21M, 21C, and 21K, the optical system unit 50 that irradiates the photosensitive drum 22 of each of the image forming units 21Y, 21M, 21C, and 21K with a laser beam. The optical system unit 50 includes, in addition to a semiconductor laser and a modulator, not illustrated, a polygon mirror (not illustrated) that deflects and scans a laser beam which is emitted from the semiconductor laser, a glass window (not illustrated) that passes the laser beam, and a frame (not illustrated) that is used for rendering each constituent member airtight.

The image forming section 20, in addition, includes an intermediate transfer unit 30 that multiply transfers toner images of each color formed on the photosensitive drum 22 of each of the image forming units 21Y, 21M, 21C, and 21K onto an intermediate transfer belt 31, a secondary transfer unit 40 that transfers toner images formed in a superimposed manner on the intermediate transfer unit 30 to the paper P, and a fixing device 45 that fixes the toner images formed on the paper P by heating and pressing.

The intermediate transfer unit 30 includes the intermediate transfer belt 31, a drive roller 32 that drives the intermediate transfer belt 31, and a tension roller 33 that applies constant tension to the intermediate transfer belt 31. In addition, the intermediate transfer unit 30 includes multiple (four in the present exemplary embodiment) primary transfer rollers 34 that face each photosensitive drum 22 with the intermediate transfer belt 31 interposed therebetween in order to transfer the toner images formed on the photosensitive drums 22 onto the intermediate transfer belt 31 and a backup roller 35 that faces a secondary transfer roller 41, later described, through the intermediate transfer belt 31.

The intermediate transfer belt 31 extends over multiple rotating components such as the drive roller 32, the tension roller 33, the multiple primary transfer rollers 34, the backup roller 35, and a driven roller 36. The intermediate transfer belt 31 is circularly driven at a predetermined speed in the direction of an arrow by the drive roller 32 that is rotationally driven by a drive motor (not illustrated). The intermediate transfer belt 31 that is made of, for example, rubber or resin is used.

The intermediate transfer unit 30 includes a cleaning device 37 that removes residual toner and the like present on the intermediate transfer belt 31. The cleaning device 37 removes residual toner, paper dust, and the like from the surface of the intermediate transfer belt 31 after a toner image transfer process is ended.

The secondary transfer unit 40 includes the secondary transfer roller 41 that is disposed at a secondary transfer position and presses the backup roller 35 through the intermediate transfer belt 31 and secondarily transfers an image onto the paper P. The secondary transfer roller 41 and the backup roller 35 that faces the secondary transfer roller 41 through the intermediate transfer belt 31 constitute the secondary transfer position at which the toner images transferred to the intermediate transfer belt 31 are transferred to the paper P.

The fixing device 45 fixes the image (toner images), which is secondarily transferred onto the paper P by the secondary transfer unit 40, to the paper P using heat and pressure with a heat fixing roller 46 and a pressing roller 47.

The paper supply unit 60 includes a paper accommodation unit 61 that accommodates the paper P on which an image is recorded, a feed roller 62 that forwards the paper P accommodated in each paper accommodation unit 61, a transport path 63 along which the paper P forwarded by the feed roller 62 is transported, and transport rollers 64, 65, and 66 that are arranged along the transport path 63 and transport the paper P forwarded by the feed roller 62 to the secondary transfer position.

The paper output unit 70 includes a first stack tray 71 that is disposed above the image forming section 20 and on which papers on which images are formed by the image forming section 20 are stacked and includes a second stack tray 72 that is disposed between the first stack tray 71 and the image reading device 100 and on which papers on which images are formed by the image forming section 20 are stacked.

The paper output unit 70 includes a transport roller 75 that is further disposed downstream in a transport direction than the fixing device 45 to transport the paper P on which toner images are fixed and a switching gate 76 that is disposed on the downstream side of the transport roller 75 in the transport direction to switch the transport direction of the paper P. In addition, the paper output unit 70 includes, on the downstream side of the switching gate 76 in the transport direction, a first output roller 77 that outputs the paper P transported in one of the transport directions (rightward in FIG. 2) switched by the switching gate 76 to the first stack tray 71. In addition, the paper output unit 70 includes, on the downstream side of the switching gate 76 in the transport direction, a transport roller 78 that transports the paper P transported in the other of the transport directions (upward in FIG. 2) switched by the switching gate 76 and a second output roller 79 that outputs the paper P transported by the transport roller 78 to the second stack tray 72.

The reversal transporting unit 80 includes, at a side of the fixing device 45, a reversal transporting path 81 along which the paper P reversed by rotating the transport roller 78 in the opposite direction from a direction in which the paper P is output to the second stack tray 72 is transported. In the reversal transporting path 81, multiple transport rollers 82 are disposed along the reversal transporting path 81. The paper P that is transported by the transport rollers 82 is again sent to the secondary transfer position by the transport rollers 82.

The image recording device 200 includes an apparatus main body frame 11 that directly or indirectly supports the image forming section 20, the paper supply unit 60, the paper output unit 70, the reversal transporting unit 80, and the control device 900 and an apparatus casing 12 that is attached to the apparatus main body frame 11 and forms the exterior of the image forming apparatus 1.

The apparatus main body frame 11 includes the switching gate 76, the first output roller 77, the transport roller 78, the second output roller 79, and the like on one end portion side of the image forming apparatus 1 in the horizontal direction and includes a reading device support unit 13 that extends in the vertical direction to support the image reading device 100. The reading device support unit 13 supports the image reading device 100 in cooperation with an inside part of the apparatus main body frame 11.

The image recording device 200 includes a front cover 15 that is disposed on the front side of the image forming section 20 and attached in a closably openable manner with respect to the apparatus main body frame 11 as a part of the apparatus casing 12.

The user may open the front cover 15 and replace the intermediate transfer unit 30 or the toner cartridges 29Y, 29M, 29C, and 29K of the image forming section 20 with a new one.

The user interface 300 includes a touch panel. Including a touch panel in the user interface 300 allows various information such as an image forming condition of the image forming apparatus 1 to be displayed on the touch panel. Furthermore, the user selects a type of operation of the image forming apparatus 1 or inputs the image forming condition and the like by touching a software key displayed on the touch panel.

The user interface 300 includes a hardware key which is not illustrated. This hardware key corresponds to, for example, a start button used for initiating operation of the image forming apparatus 1 and a reset button that returns settings of the image forming apparatus 1 to the initial state.

The image forming apparatus 1 that is configured as heretofore described operates, for example, as follows.

The user may perform printing by transmitting print data from, for example, a personal computer (PC) to the image forming apparatus 1 to form an image based on the print data using the image recording device 200. In addition, the user, for example, may scan the original document using the image reading device 100. The read image data is image processed by the control device 900 and is post-processed subsequently. This post-processing is, for example, image formation performed by the image recording device 200. Accordingly, the original document may be copied by using the image forming apparatus 1. Furthermore, the post-processing is, for example, retaining the image data inside the image forming apparatus 1 or in the PC that is connected to a communication line. Furthermore, the post-processing is, for example, facsimile transmission through a communication line.

In the present exemplary embodiment, in a case of retaining the read image data inside the image forming apparatus 1 or in the PC connected to the communication line, the image data may be divided in units of pages.

FIGS. 3A and 3B are diagrams illustrating division of the image data in units of pages.

FIG. 3A illustrates the original document. As illustrated in FIG. 3A, the original document is configured of multiple pages, and identification information (identification code) is printed on the first page (leading page) thereof as information used for division of the read image data in units of pages. In this case, as the identification code, a QR CODE (registered trademark) that is an example of a two-dimensional barcode is printed in an upper right portion of the first page in FIG. 3A. The QR CODE is printed on not only the first page but also an intermediate page corresponding to the second or subsequent page. The control device 900 divides the image data in units of pages based on information represented in the QR CODE. The page on which the QR CODE is printed is called, for example, a header sheet or a cut sheet.

FIG. 3B is a conceptual diagram after division of the image data in units of pages.

In the example illustrated in FIG. 3B, the image data is divided by classification into three types of documents of a contract document, an order document, and an application document based on the information represented in the QR CODE. Then, the documents are retained in the folders respectively named "contract document, "order document", and "application document".

As such, in a case of dividing the image data in units of pages, the QR CODE is required to be detected (found or searched).

However, detection of the QR CODE generally requires time. For example, detecting the QR CODE from one page of the image data requires 1 second (s) or more of time, and as the number of pages is large, a large amount of time is required for detection of the QR CODE.

Figure 4A:
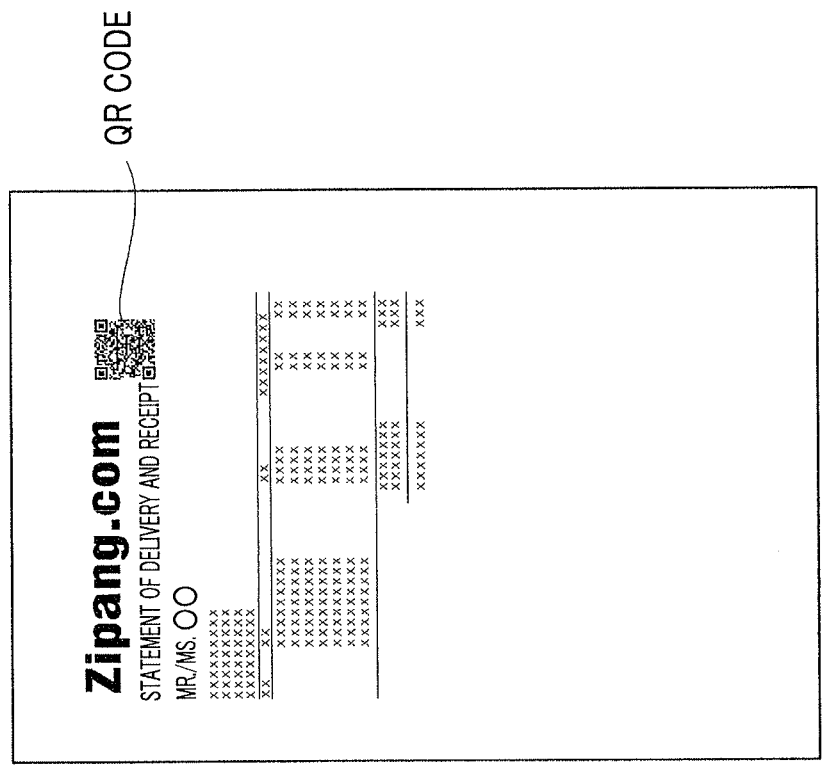
FIG. 4A is a diagram illustrating an example of a header sheet.
Figure 4B:
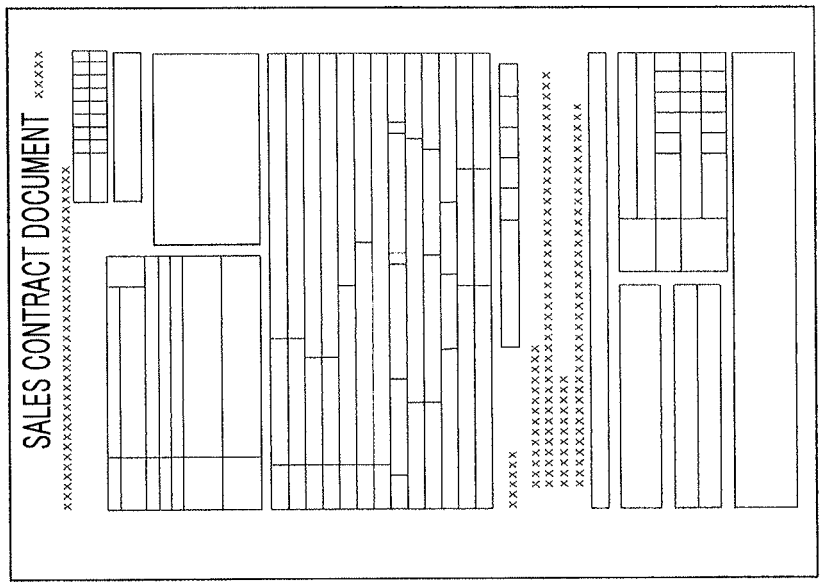
FIG. 4B is a diagram illustrating an example of a page other than the header sheet.

FIG. 4A is a diagram illustrating an example of the header sheet. FIG. 4B is a diagram illustrating an example of a page other than the header sheet.

In the example illustrated in FIG. 4A, the QR CODE is printed at the upper right of the header sheet. In addition, the contents of the subsequent pages are printed thereon. The example illustrated in FIG. 4B is a sales contract document.

Since header sheets are typically created in the same format, the images thereof are similar to each other. On the contrary, as understood from comparison of FIG. 4A with FIG. 4B, the image of the header sheet is typically not similar to the image of the page other than the header sheet.

Therefore, with focus on this point of dissimilarity, the control device 900 is configured as below described in the present exemplary embodiment to prevent the above problem.

Description of Control Device 900

Figure 5:
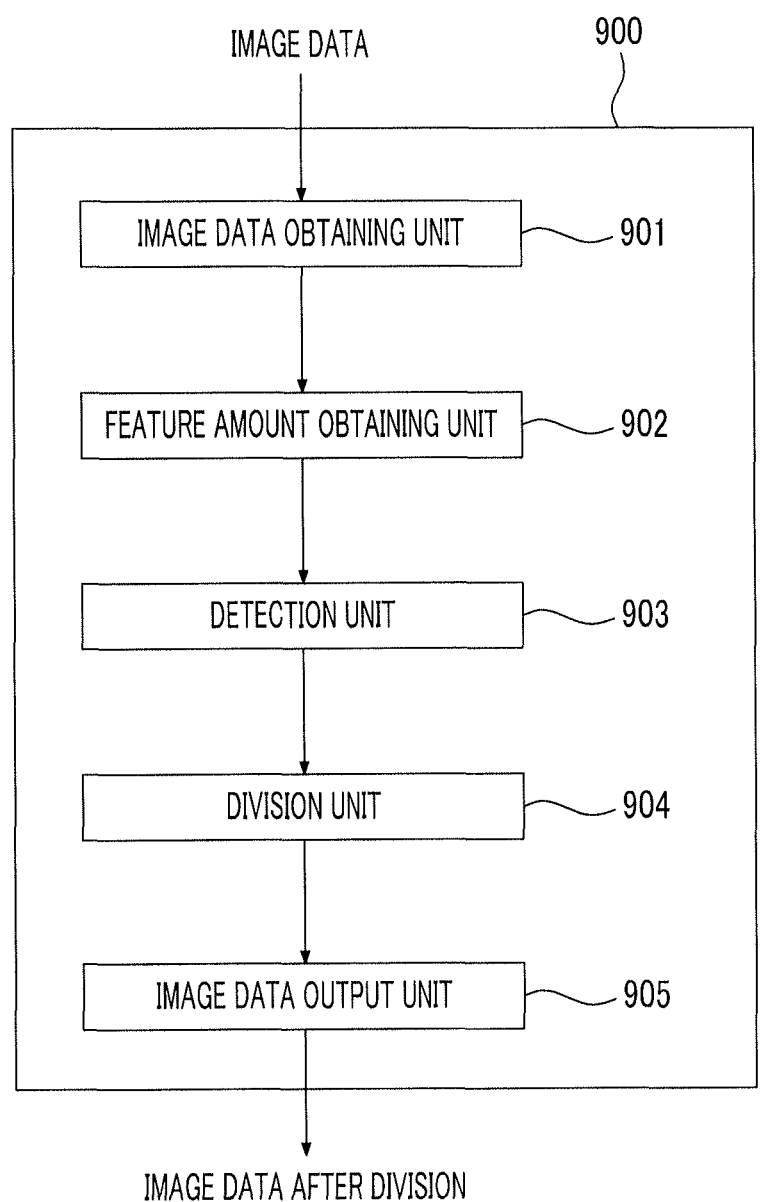
FIG. 5 is a block diagram illustrating a functional configuration example of a control device.

FIG. 5 is a block diagram illustrating a functional configuration example of the control device 900.

In FIG. 5, functions that are related to the present exemplary embodiment are selectively illustrated from among various functions that the control device 900 has.

The control device 900 is an example of an image processor that divides multiple pages in units of pages based on the identification code formed in an image. As illustrated in FIG. 5, the control device 900 of the present exemplary embodiment includes an image data obtaining unit 901, a feature amount obtaining unit 902, a detection unit 903, a division unit 904, and an image data output unit 905.

The image data obtaining unit 901 obtains the image data of the original document, which is configured of multiple pages, read by the image reading device 100.

The feature amount obtaining unit 902 obtains a predetermined feature amount for each page based on the image data obtained by the image data obtaining unit 901.

The detection unit 903 compares the feature amount of one page on which the QR CODE used for division of multiple pages in units of pages is formed with the feature amount of other pages and detects the identification information of the page having a feature amount similar to that of the one page from among the other pages.

Processing performed by the feature amount obtaining unit 902 and the detection unit 903 will be described in detail later.

The division unit 904 divides multiple pages in units of pages based on the QR CODE detected by the detection unit 903. That is, the division unit 904 decodes the detected QR CODE and divides multiple pages in units of pages based on decoded information.

The image data output unit 905 outputs the image data after the image data is divided in units of pages by the division unit 904. The image data output by the image data output unit 905 is, for example, retained inside the image forming apparatus 1 or in the PC connected to the communication line as above described.

Descriptions of Feature Amount Obtaining Unit 902 and Detection Unit 903

Next, processing performed by the feature amount obtaining unit 902 and the detection unit 903 will be described in detail.

In the present exemplary embodiment, the feature amount obtaining unit 902 obtains at least one of an image data size, color/black-and-white identification information, and a blank paper detection result for each page as the predetermined feature amount.

The image data size may also be referred to as the data amount of the image data. The image data at this point is preferably compressed. If the image data is not compressed, the image data size may be approximately the same for all pages, depending on the format of the image data. On the contrary, if the image data is compressed, the image data size is likely to be different.

The color/black-and-white identification information is information that is used for identification of whether the image is in color or in black and white.

The blank paper detection result is information as to whether each page is blank. When a page is not blank, the blank paper detection result indicates position (coordinate) information on the paper at the time of the presence of non-white image data when the image is scanned. That is, in this case, the blank paper detection result indicates a position on the image that is determined not to be blank. This position may be defined by the number of pixels or may be defined as a position of a block when the paper is divided into predetermined blocks. In the present exemplary embodiment, description will be provided in a case of employing the latter.

The detection unit 903 compares the feature amount of the one page on which the QR CODE is formed with the feature amount of the other pages. Then, the detection unit 903 selects a page having a feature amount similar to that of the one page from among the other pages. The one page on which the QR CODE is formed is, for example, the first page (leading page) and is the header sheet. In this case, the other pages are the second and subsequent pages (pages other than the leading page).

Figure 6A:
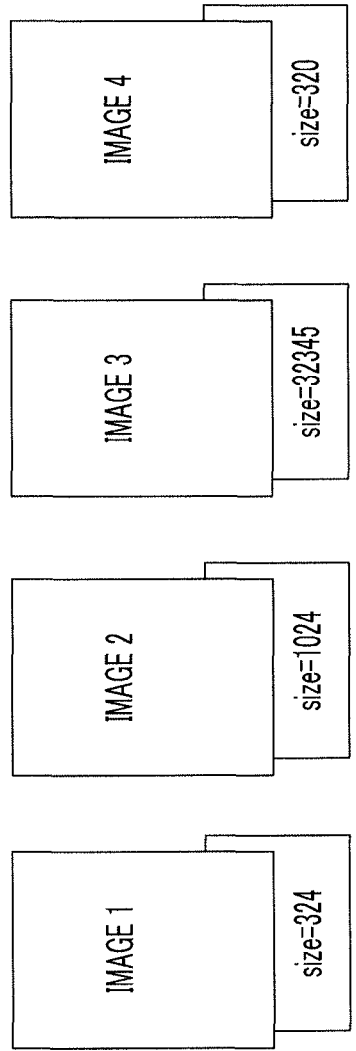
FIGS. 6A and 6B are conceptual diagrams illustrating processing performed by a detection unit.
Figure 6B:
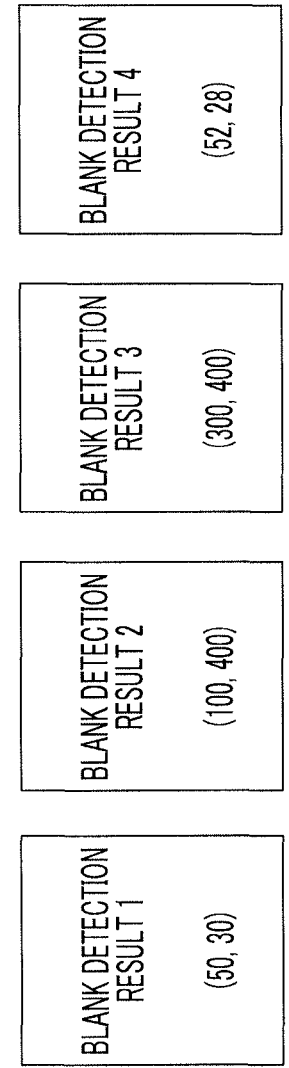

FIGS. 6A and 6B are conceptual diagrams illustrating processing performed by the detection unit 903.

FIG. 6A illustrates an example in which the detection unit 903 first compares the image data size as the feature amount. The original document is illustrated as being configured of four pages, and an image 1, an image 2, an image 3, and an image 4 respectively illustrate the images of the first page (header sheet), the second page, the third page, and the fourth page. The image data size of each image is assumed to be 324 kbytes, 1024 kbytes, 32345 kbytes, and 320 kbytes.

At this point, the detection unit 903 selects the image data of the fourth page as the page having an image data size similar to the image data size of the first page. This processing is performed by, for example, selecting a page having an image data size within a predetermined threshold range from the image data size of the first page. In this case, the threshold is, for example, ±20 kbytes, and accordingly, the detection unit 903 selects a page having an image data size within the range of 324 kbytes±20 kbytes.

FIG. 6B illustrates an example in which the detection unit 903 subsequently compares the blank paper detection result as the feature amount. In FIG. 6B, illustrated are a blank paper detection result 1, a blank paper detection result 2, a blank paper detection result 3, and a blank paper detection result 4 that are obtained as blank paper detection results from the first page, the second page, the third page, and the fourth page. Each blank paper detection result is output as the position (coordinates) of a block on the paper at the time of the presence of non-white image data. In this case, the blank paper detection results indicate that the first page, the second page, the third page, and the fourth page are not blank and that non-white image data is present at the positions (50, 30), (100, 400), (300, 400), and (52, 28) in each of the pages. The position (50, 30) indicates a position that is moved by 50 blocks in the right direction of FIG. 6B and 30 blocks in the downward direction of FIG. 6B from the uppermost and leftmost block of the paper in FIG. 6B, given that the uppermost and leftmost block is (0, 0) when the paper is divided into predetermined blocks.

At this point, the detection unit 903 selects the image data of the fourth page as the page having a blank paper detection result similar to the blank paper detection result of the first page. This processing is performed by, for example, selecting a page having a blank paper detection result within a predetermined threshold range from the blank paper detection result of the first page. In this case, the threshold is, for example, ±30, and accordingly, the detection unit 903 selects a page having a blank paper detection result within the range of (50±30, 30±30).

The detection unit 903 then detects the identification codes included in the first page and the selected page.

Description of Operation of Control Device 900

Next, operation of the control device 900 will be described.

FIG. 7 is a flowchart illustrating operation of the control device 900.

First, the image data obtaining unit 901 obtains the image data of the original document that is read by the image reading device 100 (Step S101).

The feature amount obtaining unit 902 then obtains a predetermined feature amount for each page based on the image data obtained in Step S101 (Step S102). This feature amount corresponds to at least one of the image data size, the color/black-and-white identification information, and the blank paper detection result as above described.

The detection unit 903 then compares the feature amount of the first page on which the QR CODE is formed with the feature amount of the other pages (Step S103).

The detection unit 903 selects a page having a feature amount similar to the feature amount of the first page from among the other pages (Step S104).

The detection unit 903 then detects the QR CODEs included in the first page and the selected page (Step S105).

The division unit 904 then decodes the detected QR CODEs and divides the multiple pages in units of pages (Step S106).

The image data output unit 905 then outputs the image data after division (Step S107).

In the present exemplary embodiment, the header sheets are extracted by using the fact that the header sheets on which the QR CODEs are printed are typically created in the same format and that the header sheets have a similar feature amount. As a consequence, the QR CODE is not required to be detected on all of the pages, and detection of the QR CODE may be performed on the page selected by the detection unit 903. Thus, page division may be performed more promptly. Obtaining of the above feature amount from the image data of the first page may be performed in, for example, several tens of ms. Meanwhile, detection of the QR CODE from the image data of the first page requires 1 second (s) or more of time. That is, the amount of processing time for obtaining of the feature amount is several tens of times smaller than that for detection of the QR CODE, and obtaining of the feature amount, if performed, is unlikely to affect the entire processing. The present exemplary embodiment may be said to use the image data size, the color/black-and-white identification information, and the blank paper detection result, above described, that place little load on the processing required for obtaining of the feature amount.

While the identification code is a QR CODE in the above example, the identification code is not limited thereto and may be a two-dimensional barcode or a one-dimensional barcode. Further alternatively, the identification code may be a MISTCODE (registered trademark).

While the detection unit 903 does not use the color/black-and-white identification information in the above example, the detection unit 903 may use the color/black-and-white identification information. In this case, the detection unit 903 selects a black-and-white page since the page on which the QR CODE is printed is typically in black and white.

If the detection unit 903 selects different pages in a case of using two or more feature amounts of the image data size, the color/black-and-white identification information, and the blank paper detection result, the detection unit 903 detects the QR CODE on all pages selected based on each feature amount.

While the QR CODE is illustrated as being printed on the first page in the above example, the QR CODE is not limited thereto and may be printed on the second or subsequent page.

While the number of pages on which the QR CODE is printed is initially known in the description of the above example, the number may not be known. That is, in this case, detection of the QR CODE may be performed in order on the pages, and the above processing may be performed by using the page on which the QR CODE is initially detected as the one page and the subsequent pages as the other pages.

Description of Program

The processing performed by the control device 900 in the present exemplary embodiment is performed by, for example, a CPU, not illustrated, inside a control computer disposed in the control device 900 that loads various programs stored in an HDD or the like into a main memory and executes the programs.

Accordingly, the processing performed by the control device 900 may be perceived as a program causing a computer to realize an image data obtaining function that obtains the image data of the original document configured of multiple pages, a feature amount obtaining function that obtains a predetermined feature amount for each of the pages based on the obtained image data, a detection function that compares the feature amount of one page on which the identification information for division of the multiple pages in units of pages is formed with the feature amount of the other pages and detects the identification information of a page having a feature amount similar to that of the one page from among the other pages, and a division function that divides the multiple pages in units of pages based on the detected identification information.

The program that realizes the present exemplary embodiment may be provided not only by a communicator but also by storing the program in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor configured to serve at least as:
    an image data obtaining unit that obtains image data of an original document including a plurality of pages;
    a feature amount obtaining unit that obtains a predetermined feature amount for each of the pages based on the obtained image data;
    a detection unit that
        compares a feature amount of one page on which identification information for dividing the plurality of pages in units of pages is formed with a feature amount of the other pages to identify pages similar to the one page, and
        detects the identification information on the identified similar pages having a feature amount similar to a feature amount of the one page from among the other pages, wherein the identification information is based on QR Code; and
    a division unit that divides the plurality of pages in units of pages based on the detected identification information.

2. The image processing apparatus according to claim 1, wherein the feature amount obtaining unit obtains at least one of an image data size, color/black-and-white identification information, and a blank paper detection result as the feature amount.

3. The image processing apparatus according to claim 2, wherein the blank paper detection result indicates a position on an image that is determined not to be blank.

4. The image processing apparatus according to claim 3, wherein the one page is a first page of the plurality of pages.

5. The image processing apparatus according to claim 2, wherein the one page is a first page of the plurality of pages.

6. The image processing apparatus according to claim 1, wherein the one page is a first page of the plurality of pages.

7. An image processing system comprising:
an image reader that reads an image of an original document including a plurality of pages and generates image data; and
an image processor that divides the image data into a plurality of images in units of pages based on identification information formed on the plurality of images in the image data,
wherein the image processor includes
  an image data obtaining unit that obtains image data of the original document,
  a feature amount obtaining unit that obtains a predetermined feature amount for each of the pages based on the obtained image data,
  a detection unit that
    compares a feature amount of one page on which identification information for dividing the plurality of pages in units of pages is formed with a feature amount of the other pages to identify pages similar to the one page, and
    detects the identification information on the identified similar pages having a feature amount similar to a feature amount of the one page from among the other pages, wherein the identification information is based on QR Code, and
  a division unit that divides the plurality of pages in units of pages based on the detected identification information.

8. A non-transitory computer readable medium storing a program causing a computer to execute image processing, the image processing comprising:
  obtaining image data of an original document including a plurality of pages;
  obtaining a predetermined feature amount for each of the pages based on the obtained image data;
  comparing a feature amount of one page on which identification information for dividing the plurality of pages in units of pages is formed with a feature amount of the other pages to identify pages similar to the one page and detecting the identification information on the identified similar pages having a feature amount similar to a feature amount of the one page from among the other pages, wherein the identification information is based on QR code; and
  dividing the plurality of pages in units of pages based on the detected identification information.

* * * * *